Jan. 10, 1928.　　　　　　　　　　　　　　　　　　　　1,655,854
F. BAILEY ET AL
PUNCTURE LOCATOR
Filed Oct. 25, 1926
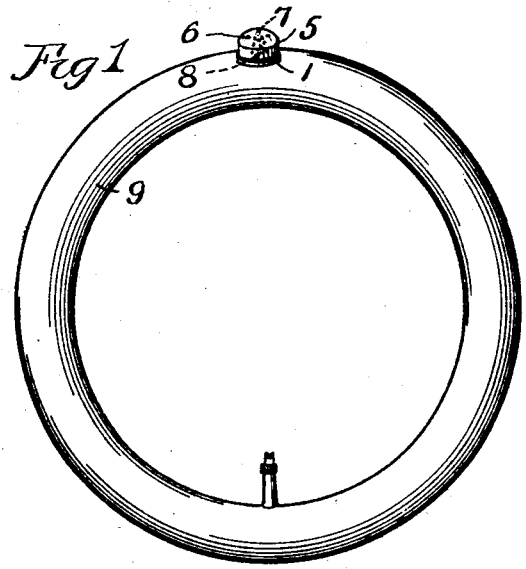
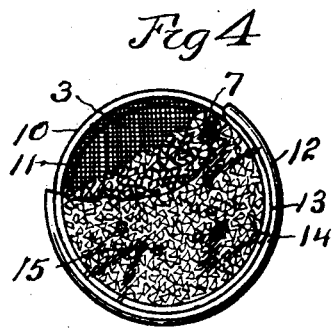
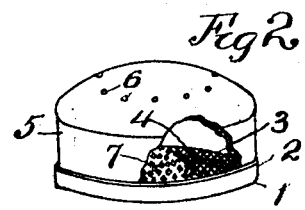
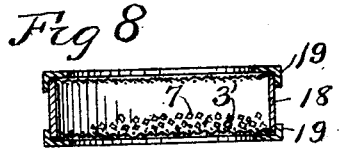
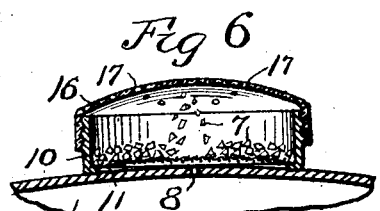
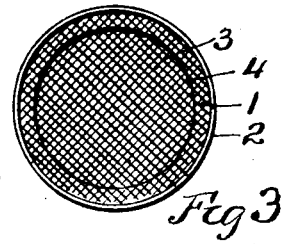
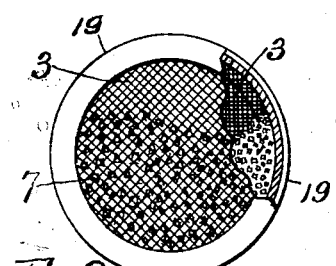
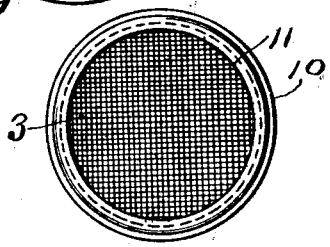
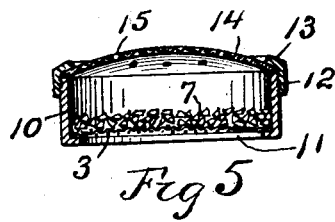
Witness:
R. E. Hamilton
INVENTORS
Frank Bailey
BY Walter S. Engel
Warren D. House
Their ATTORNEY.

Patented Jan. 10, 1928.

1,655,854

UNITED STATES PATENT OFFICE.

FRANK BAILEY AND WALTER S. ENGEL, OF KANSAS CITY, MISSOURI.

PUNCTURE LOCATOR.

Application filed October 25, 1926. Serial No. 143,844.

Our invention relates to improvements in puncture locators.

One of the objects of our invention is to provide a novel device by which a puncture in an inflatable tire or an inner tube may be easily and quickly located without having to immerse the tire or tube.

A further object of our invention is to provide a puncture locator which is simple, cheap, easily operated, convenient to carry in the pocket, not liable to get out of order, durable, and with which a puncture can be quickly located.

The novel features of our invention are hereinafter fully described and claimed.

In the accompanying drawing, which illustrates our invention.

Fig. 1 is an elevation of a partly inflated inner tube on which is mounted over a puncture a puncture locator embodying the preferred form of our improvement.

Fig. 2 is a perspective view of the locator shown in Fig. 1, enlarged, and partly broken away.

Fig. 3 is a top view of the annular bottom member shown in Fig. 2, and the screen mounted thereon.

Fig. 4 is a top view, partly broken away, of a modification of our invention embodying a transparent top plate retained on the bottom member by a threaded ring.

Fig. 5 is a vertical section of the modification shown in Fig. 4.

Fig. 6 is a vertical section of another modification of our invention, shown mounted on a portion of a tube having a puncture, and embodying a transparent screw cap fitted on the annular bottom member.

Fig. 7 is a bottom view of the locator shown in Fig. 6.

Fig. 8 is a vertical section of another modification of our invention in which the container comprises two screens held to the ends of a tube by two rings.

Fig. 9 is a top view, partly broken away, of the locator shown in Fig. 8.

Similar reference characters designate similar parts in the different views.

Referring to Figs. 1, 2 and 3, 1 designates an annular bottom member of the container, provided with an upwardly extending peripheral flange 2 which encircles a circular wire screen 3, which covers the opening 4 in the member 1 and which is retained in place by the lower edge of an inverted transparent cup shaped upper member 5, which may have, if desired, some small air outlet openings 6.

Held loosely in the container on the screen 3 are particles 7 of light material, such as particles of cork, paper, bran or other suitable light material, which particles are adapted to be lifted by air escaping from a puncture, as designated by 8 in Fig. 1, and projected through the opening 4 and screen 3.

In operating the locator shown in Figs. 1, 2 and 3, the inner tube or inflatable tire 9, Fig. 1 is partly inflated and the bottom member 1 is pressed against the tube or tire and quickly moved over the surface thereof. When the opening 4 of the container alines with a puncture, as 8, Fig. 1 and Fig. 6, the particles 7 immediately over the puncture will be blown upwardly by the escaping air, thus locating for the operator, who is looking into the container through the transparent member 5, the exact position of the puncture.

The air entering the container from the puncture can have free escape therefrom through the small openings 6. These openings increase the activity of the particles, but a disturbance of the particles would occur if they were not present in the member 5.

In the form shown in Figs. 4 and 5, the bottom member 10 is a cup shaped member having a large bottom opening 11 covered by a screen 3, similar to the one already described and fastened to the bottom of the member 10, as by being soldered thereto.

The upper end of the member 10 is externally threaded and has fitted to it a threaded ring 12, having an inner annular flange 13 which bears on the upper side of a concavo-convex top plate 14, which rests on the upper edge of the member 10, and which provides a means for observation of the particles 7 lying on the screen 3. The plate 14 may have small air outlet holes 15.

This form of our invention is operated in the same manner as was described in connection with the form shown in Figs. 1, 2 and 3.

In the form shown in Figs. 6 and 7, the bottom member 10 is the same in form and function as the corresponding member in Fig. 5, and the screen 3 is mounted therein in a like manner. Fitted on the threaded upper member 10, Fig. 6, is a threaded transparent cup shaped upper member 16 having air holes 17, if desired. This form is operated in the manner already described, it being provided with the light particles 7, as in the previously described forms.

In the form shown in Figs. 8 and 9, a vertical tube 18 has respectively mounted on its upper and lower ends two circular screens 3, which are respectively held thereon by two peripherally flanged rings 19 respectively tightly fitted on the ends of the tube 18.

The locator shown in Figs. 8 and 9 is operated in the manner already described, either upper or lower end, however, may be pressed against the tire or tube in seeking the puncture. The screen 3 which is uppermost will permit the air to escape from the container and the particles 7, which are also provided in this form, will be projected upwardly from the bottom screen, when the air enters the container through the bottom ring 19 from the puncture.

We do not limit our invention to the structure shown and described, as modifications, other than those shown, within the scope of the appended claim, may be made without departing from the spirit of our invention.

What we claim is:—

A puncture locator comprising a container having an annular bottom member having a peripheral flange and a transparent cup shaped upper member having its open end fitted in said flange, a screen covering the opening in the bottom member and held between the bottom member and the lower edge of the upper member, and particles of light material in said container adapted to be lifted by air escaping from a puncture and projected into said container through the opening in the bottom member and through said screen.

In testimony whereof we have signed our names to this specification.

FRANK BAILEY.
WALTER S. ENGEL.